No. 844,550. PATENTED FEB. 19, 1907.
H. W. THOMASSON.
CORN PLANTER.
APPLICATION FILED AUG. 6, 1906.
3 SHEETS—SHEET 3.
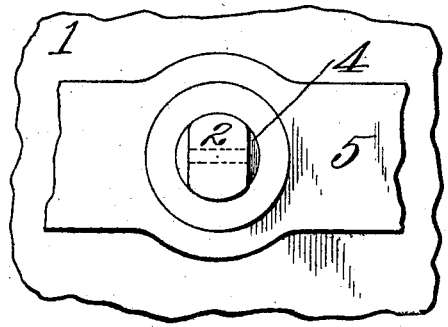
Fig. V.
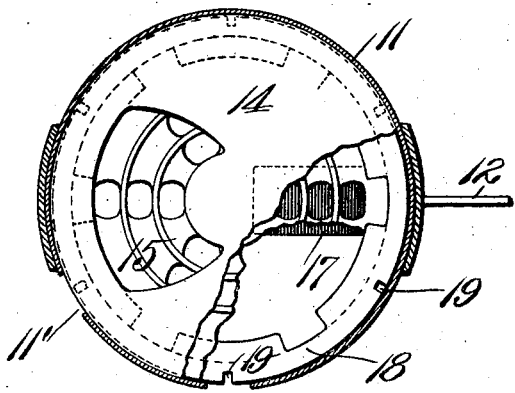
Fig. IX.
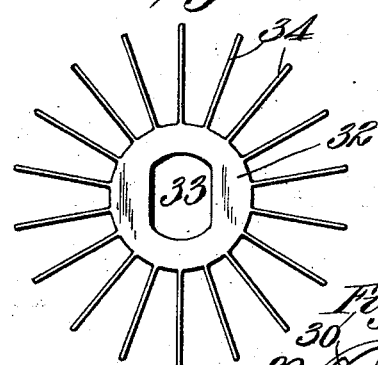
Fig. VI.
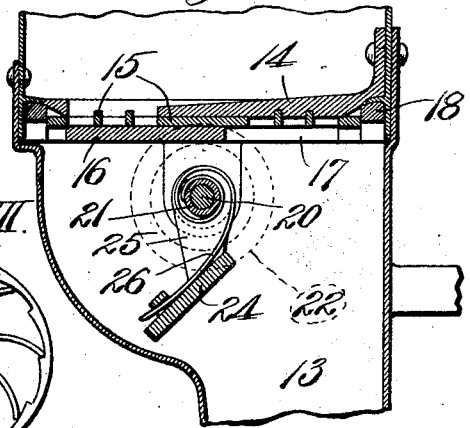
Fig. X.
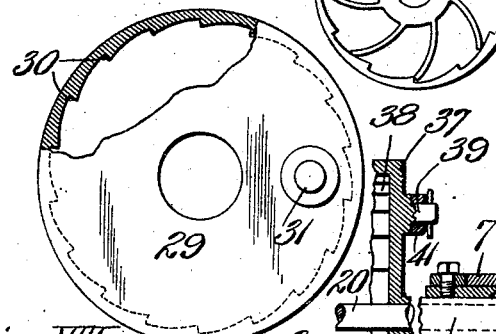
Fig. VII.
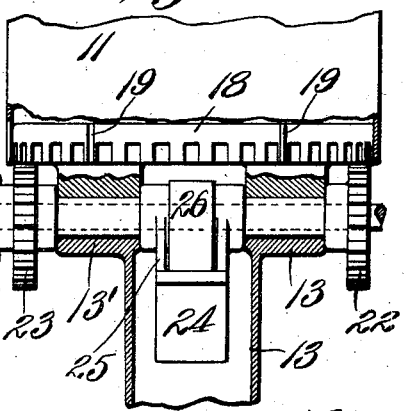
Fig. XI.
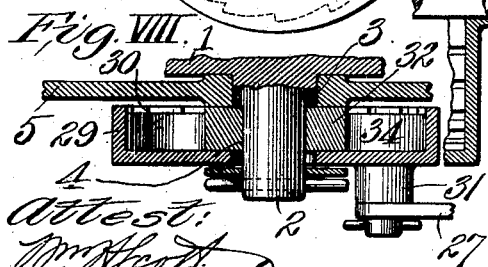
Fig. VIII.
Attest:
Wm. Scott
E. L. Knight
Inventor:
H. W. Thomasson
by G. W. Knight atty.
THE NORRIS PETERS CO., WASHINGTON, D. C.

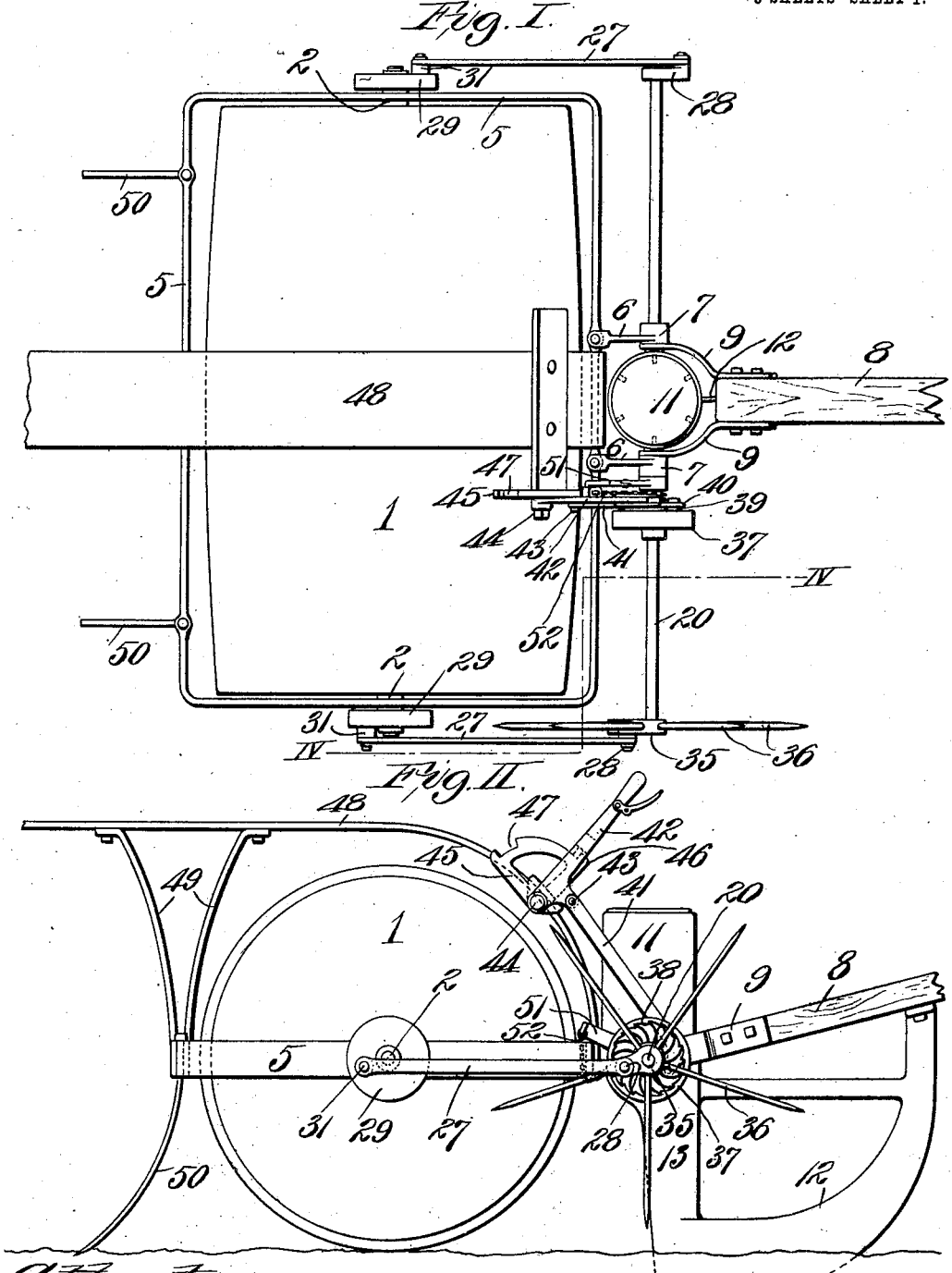

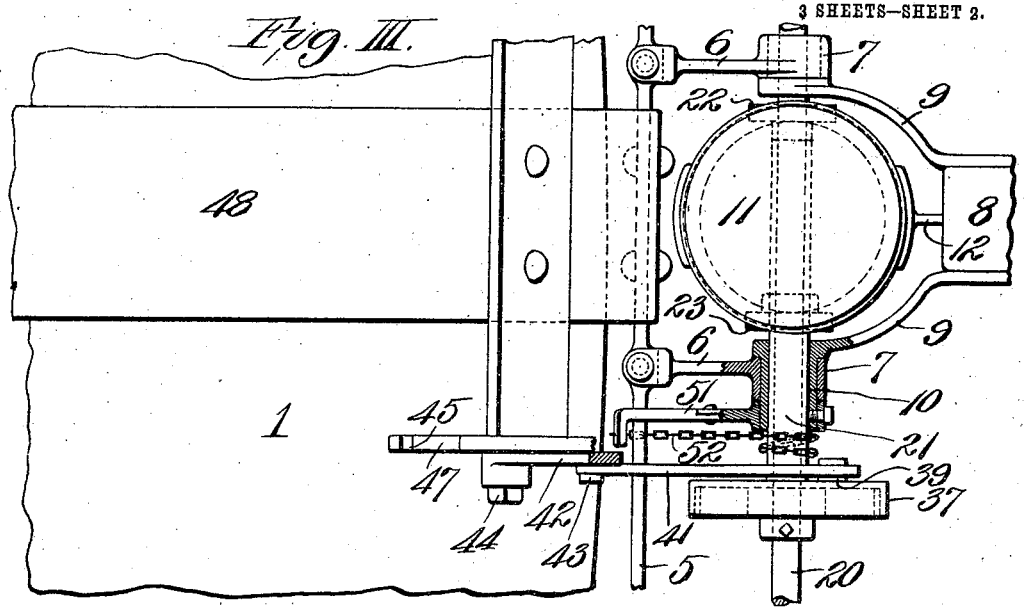

UNITED STATES PATENT OFFICE.

HUGH W. THOMASSON, OF ST. LOUIS, MISSOURI.

CORN-PLANTER.

No. 844,550.  Specification of Letters Patent.  Patented Feb. 19, 1907.

Application filed August 6, 1906. Serial No. 329,365.

*To all whom it may concern:*

Be it known that I, HUGH W. THOMASSON, a citizen of the United States, residing in the city of St. Louis, in the State of Missouri, have invented certain new and useful Improvements in Corn-Planters, of which the following is a full, clear, and exact description, reference being had to the accompanying drawings, forming part of this specification.

My invention relates to improvements in the driving mechanism of corn-planters, whereby the seed-dropping mechanism is operated, also means for indicating the proper point at which planting operation is to be started at the end of each row being planted, and means for actuating said indicating means, also to cross-row-marking means.

Figure I is a top or plan view of my corn-planter. Fig. II is a side elevation of the planter. Fig. III is an enlarged view, partly in plan and partly in horizontal section, of the central portion of my planter, including the seedbox and parts adjacent thereto. Fig. IV is an enlarged view, partly in side elevation and partly in vertical section, taken on line IV IV, Fig. I. Fig. V is an enlarged view of the central portion of one end of the driving-roller of the planter, one of its trunnions, and a portion of the planter-frame in which said trunnion operates. Fig. VI is an enlarged elevation of one of the pawl-wheels carried by the driving-roller trunnions. Fig. VII is an enlarged view, partly in elevation and partly in section, of one of the ratchet-barrels in which the trunnion-carried pawl-wheels operate. Fig. VIII is an enlarged horizontal section taken on line VIII VIII, Fig. IV. Fig. IX is an enlarged view, partly in horizontal section and partly in plan, of the seedbox and members therein, said members being partly broken away. Fig. X is an enlarged vertical section taken through the seedbox and the furrow-shoe chute located beneath said box. Fig. XI is an enlarged view, partly in elevation and partly in vertical cross-section, taken through the furrow-shoe chute at a right angle to the line at which the section shown in Fig. X is taken. Fig. XII is an elevation of one of the pawl-wheels and barrels carried by the driving-roller trunnions.

1 designates a driving or land roller that is provided at its ends with trunnions 2, the said trunnions being formed with circular portions 3 and non-circular portions 4, as seen most clearly in Figs. V and VIII.

5 is a frame of approximately rectangular form which surrounds the driving-roller and in the ends of which the circular portions 3 of the roller-trunnions are journaled.

6 are draft-arms attached to the frame 5 at its forward side and terminating at their foremost ends in collars 7.

8 is a draft-tongue equipped with straps 9, that terminate at their rear ends in bearing-sleeves 10, which are loosely journaled in the draft-arm collars 7. (See Fig. III.)

11 designates a seedbox that is located at the rear of the draft-tongue and partially positioned between the straps 9. This seedbox is supported by a furrow-shoe 12, attached to the draft-tongue, and a furrow-shoe chute 13, forming a part of said shoe and located immediately beneath said seedbox. In the seedbox is an aperture cover-plate 14, beneath which is a perforated seed-disk 15. Beneath the seed-disk is a bottom plate 16, that is provided with a seed-outlet 17, through which the seed escapes from the seedbox into the furrow-shoe chute after it has been conducted to said outlet by the seed-disk.

18 is a rack-ring located in the seedbox and to which the seed-disk is fitted. This rack-ring is driven by means to be hereinafter described, and located at intervals at the perimeter of the ring are indicating-notches 19, (see Figs. IX and XI,) the purpose of which will be hereinafter stated. The shell of the seedbox is provided at its lower end with openings 11', through which the notches in the rack-ring may be viewed from the exterior of the seedbox.

20 designates a seedbox-mechanism-operating shaft which extends across the planter in front of its driving-roller and which passes through journal-boxes 13', located at the upper end of the furrow-shoe chute 13 and through the bearing-sleeves 7 of the draft-tongue straps 9. (See Fig. III.)

21 is a sleeve surrounding the central portion of the shaft 20. This sleeve is journaled in the journal-boxes 13' and the bearing-sleeves 10, so as to be susceptible of turning loosely in said members, and the shaft 20 is journaled in said sleeve for rotation. The means by which rotary motion is imparted to the shaft 20 will be hereinafter described.

22 is a driving-wheel fixed to the shaft 20 and arranged in mesh with the rack-ring 18, (see Fig. XI,) and whereby said rack-ring is rotated to impart movement to the seed-disk 15.

23 is an idler-wheel loosely mounted on the sleeve 21 and arranged in mesh with the rack-wheel 18, this idler-wheel being located diametrically opposite to the driving-wheel 22, relative to the rack-ring 18.

24 is a check-valve supported by arms 25, loosely mounted on the sleeve 21 and controlled by a spring-arm 26, that is fixed at one end to said sleeve and the other end of which bears against said check-valve. (See Fig. X.) The check-valve normally hangs suspended in the furrow-shoe chute 13 beneath the bottom of the seedbox 11, but it is adapted to be elevated to the outlet 17 in the seedbox bottom plate 16 and close said outlet, this movement being accomplished by the rotation of the sleeve 21 in a manner to be hereinafter explained.

27 designates a pair of driving-links that have driving connection with the seedbox-mechanism-operating shaft 20 through the medium of crank-arms 28, fixed to said shaft and having loose connection with said links.

29 are ratchet-barrels loosely surrounding the driving-roller trunnions 2 and having the interior ratchet-teeth 30. (See Figs. IV, VII, VIII, and XII.) Each of said ratchet-wheels is provided with a wrist 31, to which the rear end of the corresponding driving-link 27 is loosely fitted.

32 are pawl-wheels mounted upon the non-circular portions 4 of the trunnions 2, the hubs of said pawl-wheels being provided with non-circular central openings 33, (see Figs. VI and XIII,) so that the pawl-wheels are held from rotation on the non-circular portions of said trunnions. Each pawl-wheel is provided with a plurality of spring-pawls 34, radiating from the hub of said wheel, and which extend in straight lines from said hub, as seen in Fig. VI when the pawl-wheel is removed from the barrel 29 to which it corresponds. Each pawl-wheel is adapted to be introduced into one of the ratchet-barrels 29, and when so introduced the pawls are curved, as seen most clearly in Fig. XII, in order that they will engage the teeth at the interior of said barrel and act with driving action against said teeth to rotate the barrel when the driving-roller 1 of the planter is rotated in a forward direction. It will be seen that by this construction the pawl-wheels act upon the ratchet-barrels to impart rotation thereto and that the ratchet-barrels in turn operate to impart movement to the driving-links 27, and said links in turn act to drive the seedbox-dropping-mechanism shaft 20.

35 designates a finger-wheel or star-wheel that is fixed to the seed-dropping-mechanism shaft 20 and is provided with a plurality of fingers 36, that are adapted to move in a vertical and circular path during the rotation of said shaft. The fingers of the wheel 35 are so disposed relative to the seed-dropping mechanism of the planter that one of them may be caused to point in a direct vertical line downwardly from the axis of said wheel or in approximately such vertical line when the dropping mechanism has carried seed to the outlet in the bottom of the seedbox 11, whereby the commencement of planting operation may be positively known, due to the indication by said downwardly-pointing finger. To provide for the adjustment of the finger-wheel in order that the desired indication of dropping action may be secured, I utilize the following mechanism: 37 is a ratchet-barrel having interior teeth 38 (see Figs. II, IV, and XI) and provided with a wrist 39. (See Figs. I and III.) This ratchet-barrel is fixed to the sleeve 21, that surrounds the shaft 20. 40 is a pawl-wheel similar in form to the pawl-wheel 32 and arranged to operate within the ratchet-barrel 37, the pawls of said wheel and the teeth of said barrel being, however, disposed in opposite directions to the pawls and teeth of the pawl-wheel 32 and ratchet-barrel 29 in order that there shall be no conflict between the operation of the two pawl-and-ratchet mechanisms. The pawl-wheel 40 is fixed to the dropping-mechanism shaft 20 to rotate with said shaft. 41 is an operating-rod having one of its ends loosely fitted to the wrist 39 of the ratchet-barrel 37. 42 is a hand-lever to which the other end of said rod is loosely fitted at 43. The hand-lever is pivoted at 44 to a segmental rack 45, that is provided at its forward end with a lug 46 and at its rear end with a notch 47. When the hand-lever 42 is moved forwardly toward the rack-lug 46, thrust is imparted to the operating-rod 41, and the ratchet-barrel 37 is revolved around the shaft 20, and this barrel being in engagement with the pawl-wheel 40 causes said pawl-wheel to be rotated and rotate the shaft 20, with the result of moving the finger-wheel 35 until one of its fingers points to the location in the ground at which planting operation is to begin. This location is preferably determined by producing cross-marks across the field to be planted and at what is to be the ends of the planted rows. Accurate indication as to the proper positions of the finger-wheel 35 and the dropping mechanism when the seedbox mechanism is in dropping position is afforded by the notches 19 in the rack-ring 18 when said notches appear to view through the openings 11' in the seedbox-shell and to which reference has been previously made.

The ratchet-barrel 37, operating-rod 41, and hand-lever 42 have utility in addition to that described, in that they furnish means for operating the check-valve 24 to close it when the planter is not in operation. This action is accomplished by moving the hand-lever 42 rearwardly until a catch of any suitable form carried by said lever is caused to engage in a notch 47 of the segment-rack 45. By so moving the hand-lever the connecting-rod 41 is drawn rearwardly and acts to rotate the ratchet-barrel without operating the pawl-wheel 40, and said ratchet-barrel carries with it the sleeve 21, to which the check-valve 24 is applied, thereby causing said check-valve to be seated in the outlet 17 of the seedbox bottom plate 16. When the planting operation is to be resumed, the hand-lever is returned to its former position and the check-valve is withdrawn from the seedbox-outlet.

48 designates a seat-supporting member having its forward end secured to the frame of the planter and extending rearwardly over the driving-roller 1. This seat-support has the segment-rack 45 and the hand-lever 42 applied thereto, and the support is sustained at its rear end by braces 49, that are attached to the rear portion of the frame 5.

50 designates a pair of spring marking-fingers removably seated in the rear portion of the frame 5. (See Figs. I and II.) These marking-fingers extend downwardly from the frame, and they are adapted to be utilized in producing the cross-marks in the ground previous to the commencement of planting operation in order that the fingers of the finger-wheel 35 may be brought into service in the manner explained.

For the purpose of closing the check-valve 24 to prevent seed-dropping action during the period of turning at the ends of the rows being planted in a field I utilize the following parts: 51 is a rule-joint arm fixed to the bearing-sleeve 10 of one of the draft-tongue straps 9 and extending rearwardly to a position above the forward portion of the planter-frame 5. This arm has connected to it at its rear end a chain 52, that passes beneath the frame 5 (see Figs. II, III, and IV) and thence to and around the sleeve 21, to which the chain is also attached. When it is desired to close the check-valve, the frame 5 is tilted in an upward direction and in the arc of a circle by placing a preponderance of weight upon the rear end of the seat-support 48, preferably obtained by the driver throwing his weight rearwardly upon the seat-support. When this action takes place, the chain 52 is drawn upon by the rule-joint arm, and the chain is unwound from the sleeve 21, with the result of rotating said sleeve and causing it to move the check-valve 24 to a closed position.

I claim—

1. In a corn-planter, the combination of a frame, a driving-roller having trunnions journaled in said frame, seed-dropping mechanism, ratchet mechanism mounted on said trunnions, and means of connection between said ratchet mechanism and said seed-dropping mechanism, substantially as set forth.

2. In a corn-planter, the combination of a frame, a driving-roller having trunnions journaled in said frame, seed-dropping mechanism, ratchet mechanism carried by said trunnions, and driving-links connecting said ratchet mechanism to said seed-dropping mechanism, substantially as set forth.

3. In a corn-planter, the combination of a frame, a driving-roller having trunnions journaled in said frame, a seedbox, seed-discharging means associated with said seedbox, a shaft for operating said seed-discharging means, ratchet mechanism carried by said trunnions, and means of connection between said ratchet mechanism and said shaft, substantially as set forth.

4. In a corn-planter, the combination of a frame, a driving-roller having trunnions journaled in said frame, seed-dropping mechanism, ratchet-barrels loosely mounted on said trunnions, pawl-wheels non-rotatably mounted on said trunnions, and engaging said ratchet-barrels, and means of connection between said ratchet-barrels and said seed-dropping mechanism, substantially as set forth.

5. In a corn-planter, the combination of a seedbox, seed-discharging means associated with said seedbox, a shaft for operating said seed-discharging means, an indicator-wheel carried by said shaft, and ratchet mechanism for rotating said shaft, substantially as set forth.

6. In a corn-planter, the combination of a seedbox, seed-discharging means associated with said box, a shaft for operating said seed-discharging means, an indicating-wheel carried by said shaft, a pawl-wheel fixed to said shaft, a loosely-supported ratchet-barrel associated with said pawl-wheel, and means for rotating said ratchet-barrel, substantially as set forth.

7. In a corn-planter, the combination of a seedbox, seed-discharging means associated with said box, a shaft for operating said seed-discharging means, an indicating-wheel carried by said shaft, a pawl-wheel fixed to said shaft, a loosely-supported ratchet-barrel associated with said pawl-wheel, and means for rotating said ratchet-barrel; said last-named means consisting of an operating-rod connected to said barrel and a hand-lever connected to said link, substantially as set forth.

8. In a corn-planter, the combination of a seedbox, seed-discharging means associated with said seedbox, a shaft geared to said seed-discharging means, a sleeve surrounding said shaft, a check-valve carried by said sleeve, a ratchet-barrel fixed to said sleeve, a pawl-wheel fixed to said shaft and associated with said ratchet-barrel, and means for rotating said ratchet-barrel, substantially as set forth.

9. In a corn-planter, the combination of a seedbox, seed-discharging means associated with said seedbox, a shaft geared to said seed-discharging means, an indicator-wheel carried by said shaft, and means for rotating said indicator-wheel; said seedbox being provided with openings in its wall and one of the members of the seed-discharging means being provided with notches adapted to be brought into registration with the openings in said seedbox-wall, substantially as set forth.

In testimony whereof I have hereunto set my hand.

HUGH W. THOMASSON.

In presence of—
NELLIE V. ALEXANDER,
BLANCHE HOGAN.